US005673035A

United States Patent [19]
Huang

[11] Patent Number: 5,673,035
[45] Date of Patent: Sep. 30, 1997

[54] LOCATOR PAGING SYSTEM WITH SUB KITS

[76] Inventor: Dennis Huang, 5F, No. 10, Lane 9, Ningpo E. Street, Taipei, Taiwan

[21] Appl. No.: 359,896

[22] Filed: Dec. 20, 1994

[51] Int. Cl.$^{6}$ .......... H04Q 7/18

[52] U.S. Cl. .......... 340/825.44; 340/825.54; 340/825.47; 340/825.36; 340/825.49; 455/38.2

[58] Field of Search .......... 340/825.54, 553, 340/573, 539, 825.44, 825.47, 311.1, 825.72, 825.36, 825.49; 455/38.2, 89

[56] References Cited

U.S. PATENT DOCUMENTS

| | | | |
|---|---|---|---|
| 4,777,478 | 10/1988 | Hirsch et al. | 340/573 |
| 4,785,291 | 11/1988 | Hawthorne | 340/539 X |
| 4,882,579 | 11/1989 | Siwiak | 340/825.44 |
| 5,218,344 | 6/1993 | Ricketts | 340/573 |
| 5,337,041 | 8/1994 | Friedman | 340/573 |
| 5,367,288 | 11/1994 | El Marry | 340/553 |

FOREIGN PATENT DOCUMENTS

| | | | |
|---|---|---|---|
| 4-125800 A | 4/1992 | Japan | 340/573 |

*Primary Examiner*—Michael Horabik
*Assistant Examiner*—William H. Wilson, Jr.
*Attorney, Agent, or Firm*—Bacon & Thomas

[57] ABSTRACT

A locator-paging system including a master kit and a plurality of sub kits, in which the master kit can be actuated to transmit a searching signal to each sub kit, causing every sub kit to transmit an answering signal. The master kit generates a warning signal when at least one sub kit does not transmit an answer back. The master kit can also be actuated to transmit paging signals to the sub kits. As a result, the sub kits are actuated to generate a sound and light alarm when a paging signal from the master kit is recognized. Furthermore, the sub kits can be actuated to transmit a paging signal to the master kit which causes the master kit to generate a sound and light alarm, indicating which sub kit is calling.

5 Claims, 2 Drawing Sheets

LOCATOR PAGING SYSTEM WITH SUB KITS

BACKGROUND OF THE INVENTION

The present invention relates to reminder-paging systems, and relates more particularly to a reminder-paging system with a plurality of sub kits.

Using radio receivers for out of range indication has been well known. A reminder system for out of range indication is generally comprised of a master unit carried by the user, and a sub-unit carried on the luggage, mobile telephone, child, pet, etc. When the sub-unit is left beyond the detecting range of the master unit, the master unit immediately gives a warning sound. However, if the child encounters a problem or is in a dangerous situation, he (she) cannot use the sub-unit to call the master unit for help. When one brings two or more children and luggage to travel abroad, several out of range indication systems may have to be prepared so that the children and luggage can be respectively monitored. If one child or luggage is missed (out of the detecting range of the master unit), the master unit will be triggered to give a warning signal, however the user cannot know the identification of the missing child or luggage through the warning signal.

Furthermore, regular paging system of the type having one transmitter (master unit), and one or more receivers (sub units) can be used for communication in a group. However, these paging systems only allow the person (master unit) who carries the transmitter to give messages to the person (sub unit) who carries the receiver. The person (sub unit) who carries the receiver cannot give messages to the person (master unit) who carries the transmitter.

A radio communication system allows the persons at two opposite ends to communicate with each other. However, this system does not have the function of out of range indication.

SUMMARY OF THE INVENTION

The present invention has been accomplished under the circumstances in view. It is one object of the present invention to provide a remainder-paging system which comprising a master kit and a plurality of sub kits. It is another object of the present invention to provide a remainder-paging system which gives a respective warning signal for a respective out of range indication when one sub kit is moved out of the detecting range of the master kit. It is still another object of the present invention to provide a paging system which allows two-way communication between the master kit and the sub kits.

According to the preferred embodiment of the present invention, the remainder-paging system comprises a master kit, and a plurality of sub kits. The master kit comprises a microprocessor for signal control and processing, a first key switch circuit having a plurality of key switches respectively connected to said microprocessor and operated to generate a respective paging signal through said microprocessor, a distance adjustment circuit connected to said microprocessor and controlled to set the searching signal transmitting distance of said master kit, an encoder to encode signals from said microprocessor, a first modulator to modulate encoded signals into radio frequency signals and then to transmit the modulated radio frequency signals of said master kit, a first receiver to receive external signals permitting them to be transmitted to said microprocessor, a first buzzer controlled by said microprocessor to generate a sound signal, and a first light emitting device controlled by said microprocessor to generate a light signal. The sub kits each comprises a receiving/transmitting control circuit to control and processing signal, a second key switch circuit connected to said receiving/transmitting control circuit and controlled to give said master kit a paging signal, a second receiver to receive signals from said master kit, a decoder to decode signals from said second receiver and then to send decoded signals to the receiving/transmitting control circuit, a second buzzer controlled by said receiving/transmitting control circuit to generate a sound signal, a second light emitting device controlled by said receiving/transmitting control circuit to generate a light signal, and a second modulator controlled by said receiving/transmitting control circuit to transmit signals. The master kit is operated to send searching signals to the sub kits respectively for tracking the sub kits indicated by the active state of the respective answering signal. The first buzzer and the first light emitting device of the master kit are triggered active respectively when one sub kit generates no answering signal. The master kit can be operated to generate a respective paging signal to a selected sub kit, causing the selected sub kit to generate a sound and a light indicating the calls from the master kit. Each of the sub kits can be separately operated to give a respective paging signal to the master kit, causing the master kit to generate a sound signal and a light signal indicating which sub kit is calling.

DETAILED DESCRIPTION OF THE PREFERRED EMBODIMENT

Figure 1:
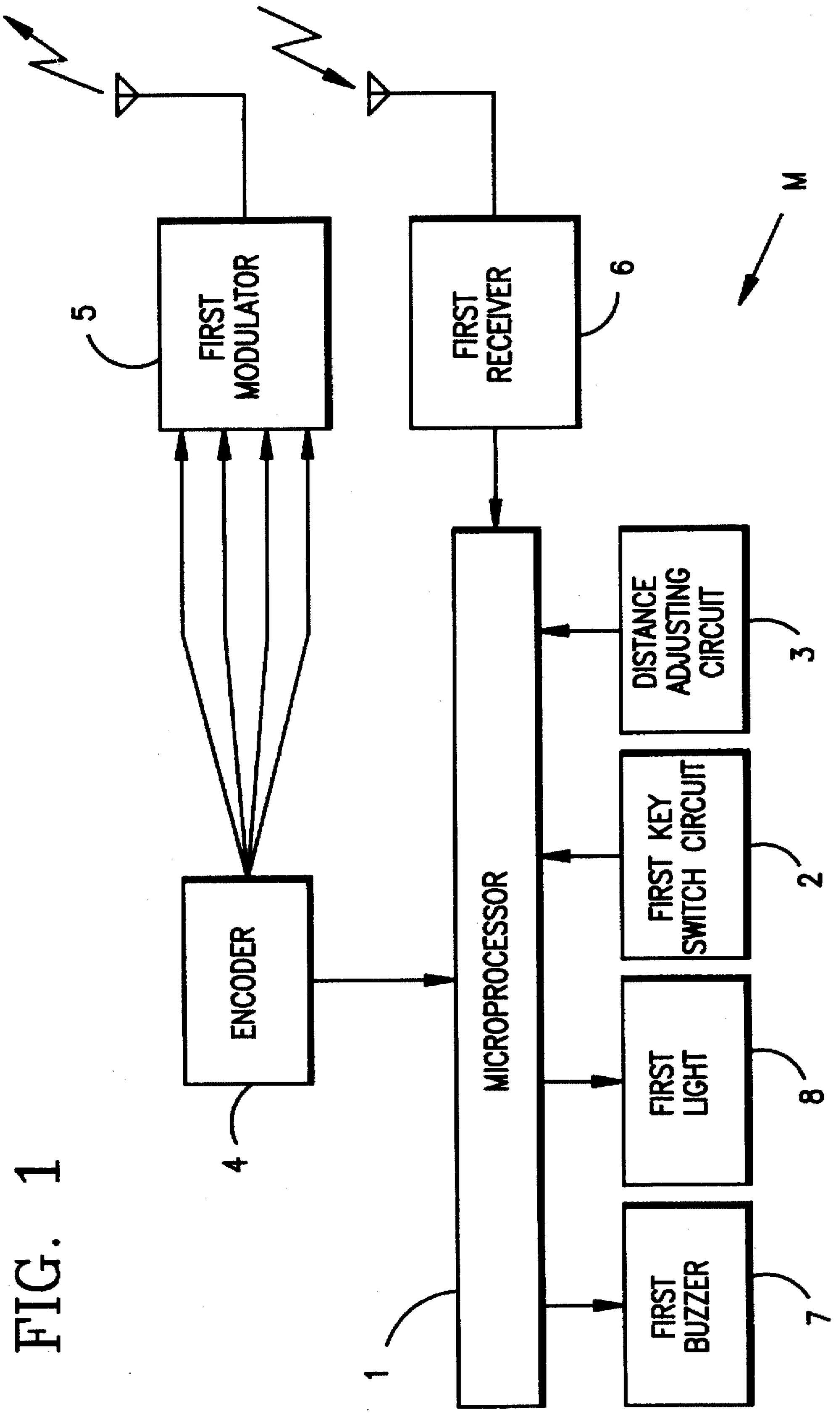
FIG. 1 is a block diagram of a master kit according to the present invention.
Figure 2:
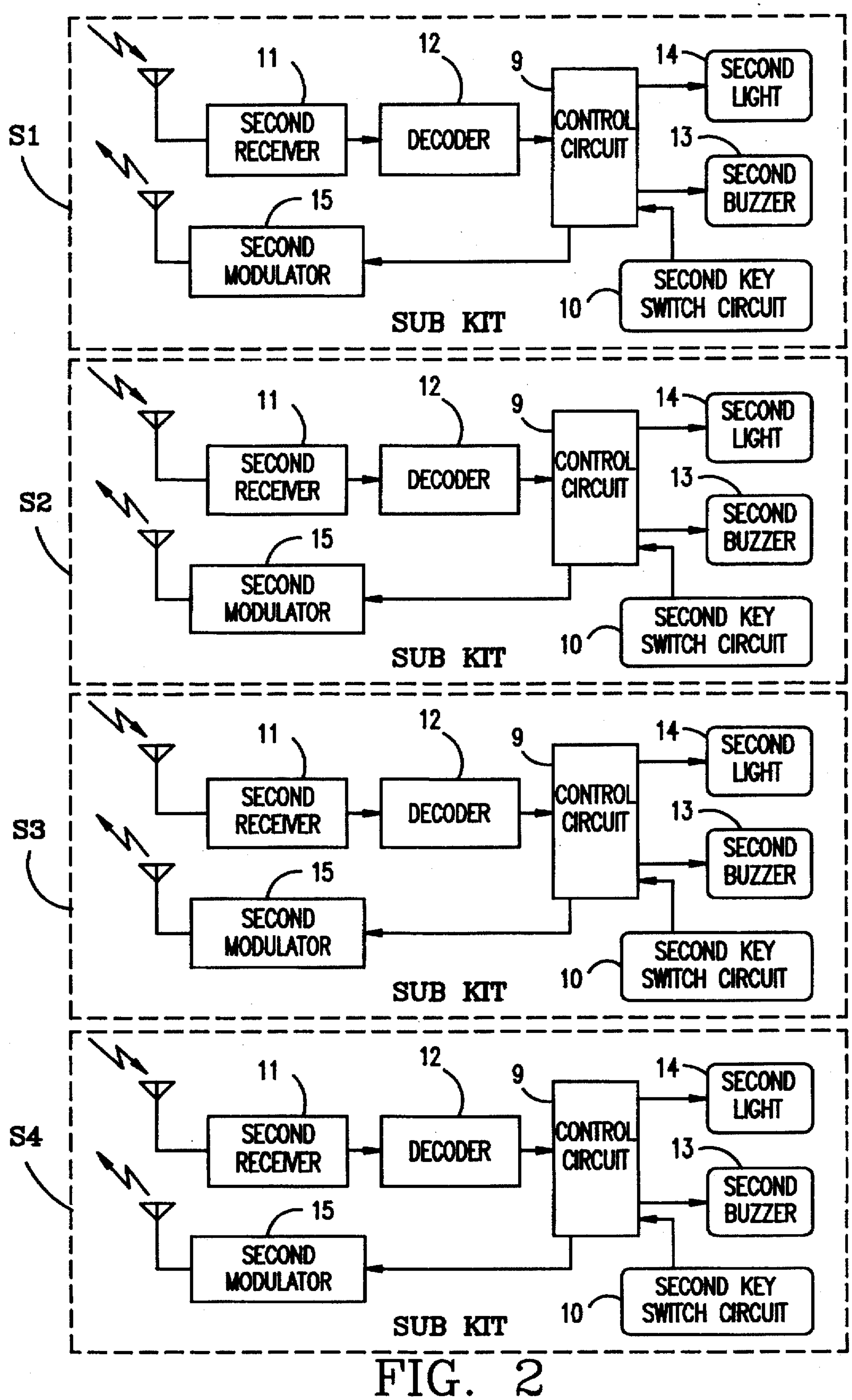
FIG. 2 is a block diagram of the sub kits according to the present invention.

Referring to FIGS. 1 and 2, a reminder-paging system in accordance with the present invention is generally comprised of a master kit M, and a plurality of sub kits S1, S2, S3, and S4.

The master kit M includes a microprocessor 1, a first key switch circuit 2, a distance adjusting circuit 3, an encoder 4, a first modulator 5, a first receiver 6, a first buzzer 7, a first light emitting device 8 (as shown in FIG. 1). Each sub kit S1, S2, S3, or S4 includes a receiving/transmitting control circuit 9, a second key switch circuit 10, a second receiver 11, a decoder 12, a second buzzer 13, a second light emitting device 14, and a second modulator 15.

The master kit M and the sub kits S1, S2, S3, and S4 are coded with a respective identification code so that when the master kit M receives a sub kit signal, it can identify which sub kit sends the signal. When one sub kit S1, S2, S3, or S4 receives a signal, the signal will be checked with its identification code. If the signal is confirmed, it means that the master kit M is calling. If the signal is not in conformity with the identification code, it means that the master kit M is calling another sub kit, and the signal will be abandoned.

The first key switch circuit 2 of the master kit M comprises sub kit keys corresponding to the sub kits S1, S2, S3, and S4. When to communicate with one sub kit S1, S2, S3, or S4, the corresponding sub kit key must be depressed. The encoder 4 of the master kit M is to give a code to the signal for transmitting master kit M is to modulate the encoded signal and then transmit it to the sub kits S1, S2, S3, and S4. The first key switch circuit 2 is connected to the microprocessor 1. When the user presses a sub kit key, the microprocessor 1 is triggered to generate a corresponding signal.

The signal from the microprocessor 1 is encoded by the encoder 4, and then transmitted through the modulator 5.

When the user wishes to set the detecting distance of the master kit M relative to the sub kits S1, S2, S3, and S4, it can be done through the distance adjust circuit 3. When a sub kit S1, S2, S3, or S4 is moved out of the detecting distance of the master kit M beyond the transmitting distance of the modulator 5, the sub kit becomes unable to receive the searching signal of the master kit M and gives no answering signal to the master kit M. If the master kit M receives no response, it will generate a sound signal and a light signal to warn the user about the situation that a certain sub kit has been left beyond the set range.

The first receiver 6 of the master kit M receives the signals of the sub kits S1, S2, S3, and S4 and sends them to the microprocessor 1. Because the signals of the sub kits S1, S2, S3, and S4 are respectively encoded, the microprocessor 1 knows which signal comes from which sub kit. Upon receipt of the signal of one sub kit S1, S2, S3, or S4, the microprocessor 1 checks the nature of the signal. If the signal is a paging signal, the master kit M will be immediately triggered to generate a sound signal and a light signal. If the signal is an answering signal, the master kit M will keep sending the searching signal through the encoder 4 and the first modulator 5.

The second buzzers 13 of the sub kits S1, S2, S3, and S4 are controlled by the respective receiving/transmitting control circuits 9 to generate a sound signal and a light signal upon the calling of the master kit M. When the second key switch circuit 10 of one sub kit S1, S2, S3, or S4 is depressed, the receiving/transmitting control circuit 9 of the respective sub kit is driven to send a paging signal to the master kit M through the second modulator 15 of the respective sub kit. The second receivers 11 of the sub kits S1, S2, S3, and S4 are to receive the signal of the master kit M. When the signal of the master kit M is received by the second receiver 11 of one sub kit S1, S2, S3, or S4, it is immediately decoded by the second decoder 12 and then sent to the receiving/transmitting control circuit 9 for recognition. If the signal is not in conformity with the identification code, it will be rejected. If the signal is recognized, it will be processed further.

Upon receipt of the searching signal from the master kit M, the receiving/transmitting control circuit 9 of the respective sub kit S1, S2, S3, or S4 sends an answering signal to the master kit M through the respective second modulator 15, informing the master kit M of the receipt of the searching signal. When the master pager M receives the answering signal, it means that the sub kit concerned is still within the set range.

When one sub kit S1, S2, S3, or S4 receives a paging signal from the master kit M, it drives the second buzzer 13 to generate a sound signal and the second light emitting device 14 to generate a light signal, informing the user of the respective sub kit S1, S2, S3, or S4 of the calling of the master kit M.

Through the coding by the microprocessor 1 of the master kit M, different radio communication codes can be generated without interfering with one another.

As an example of the present invention, the detecting range of the master kit M can be set at 5, 10, or 30 meters. If the luggage or child who carries one sub kit S1, S2, S3, or S4 is moved or moves out of the set range, the master kit M will immediately generates a sound signal and a light signal to warn the user.

As described herein before, the master kit M can simultaneously detect and call the four sub kits S1, S2, S3, and S4, and the four sub kits S1, S2, S3, and S4 can also call the master kit M. Therefore, a two-way communication is achievable. For example, the adult, who carries the master kit M, can call the children, who carry the sub kits S1, S2, S3, and S4, to see if they are safe. If one child encounters an emergency case, he (she) can call the adult through one sub kit S1, S2, S3, or S4 for help.

As the reminder-paging system of the present invention has the function of reverse paging, it is suitable for use by the members of a family or small group for the transmitting of messages by means of giving different sounds signal. For example, one-sound signal means "give answer", two-sounds signal means "go home"; three-sounds signal means "emergency, come over quickly"; . . . etc.

The users can set the detecting range at 5 meters, 10 meters, or 30 meters according to different situations and individual requirements. For example, when in a crowded place like a department store, the detecting range can be set at 5 meters; when in a part, the detecting range can be set at 10 meters; when in suburbs, the detecting range can be set at 30 meters. If a warning signal is generated when the detecting range is set at 5 meters, the setting of the detecting range can be changed to 10 meters. If the warning signal is disappeared when the setting of the detecting range is changed to 10 meters, it means that the missing child is at the area within 5–10 meters from the master kit M, and the adult can call the sub kit concerned through the master kit, causing the sub kit concerned to give a warning sound to the missing child.

While only one embodiment of the present invention has been shown and described, it will be understood that various modifications and changes could be made without departing from the spirit and scope of the invention. For example, more than four sub kits can be used to match with the master kit for communication.

What is claimed is:

1. A locator-paging system comprising:

(A) a master kit, said master kit comprising:

a microprocessor for signal control and processing:

a first key switch circuit having a plurality of key switches respectively connected to said microprocessor, said first key switch circuit forming a means for controlling a first paging signal output by said microprocessor;

a distance adjustment circuit connected to said microprocessor, said distance adjustment circuit forming a means for controlling a transmitting distance of a searching signal output by said microprocessor;

an encoder to encode said paging and searching signals from said microprocessor;

a first modulator to modulate encoded paging and searching signals into radio frequency signals and then to transmit the modulated radio frequency signals;

a first receiver for receiving second paging signals and answer signals and supplying the received second paging and answer signals to said microprocessor;

means in the form of a first buzzer controlled by said microprocessor to generate a sound signal when either of the following two events occurs: 1.) reception of a second paging signal and 2.) failure to receive an answer signal following transmission of a searching signal; and a first light emitting device controlled by said microprocessor to generate a light signal when either of said two events occurs; and (B) a plurality of sub kits, each sub kit comprising:

a receiving/transmitting control circuit for signal control and processing;

a second key switch circuit connected to said receiving/transmitting control circuit, said second key switch circuit forming a means for controlling generation of said second paging signal;

a second receiver to receive said first paging signals and said searching signals from said master kit;

a decoder to decode said first paging signals and said searching signals from said second receiver;

a receiving/transmitting control circuit including means for activating a buzzer and second light upon receipt of one of the first paging signals and for outputting answer signals upon receipt of respective first searching signals;

a second modulator controlled by said receiving/transmitting control circuit to transmit said second paging signals and said answer signals; and wherein said master kit is operated to send searching signals to said sub kits respectively for tracking said sub kits indicated by the active state of the respective answering signals, the first buzzer and the first light emitting device of said master kit are triggered active respectively when one sub kit generates no answering signal; said master kit is selectively operated to generate a paging signal to a selected sub kit, causing said selected sub kit to generate a sound and a light indicating the calls from the master kit;

each of the sub kits is selectively operated to generate a paging signal to said master kit, causing said master kit to generate a paging signal to said master kit, causing said master kit to generate a sound and a light indicating which sub kit is calling.

2. The reminder-paging system of claim 1 wherein the first light emitting device of said master kit is comprised of a plurality of light emitting diodes corresponding to said sub kits respectively.

3. The reminder-paging system of claim 1 wherein the number of said sub kits is two.

4. The reminder-paging system of claim 1 wherein the number of said sub kits is three.

5. The reminder-paging system of claim 1 wherein the number of said sub kits is four.

* * * * *